(12) United States Patent
Wu et al.

(10) Patent No.: US 12,061,990 B2
(45) Date of Patent: Aug. 13, 2024

(54) STATIC BLOCK SCHEDULING IN MASSIVELY PARALLEL SOFTWARE DEFINED HARDWARE SYSTEMS

(71) Applicant: Xilinx, Inc., San Jose, CA (US)

(72) Inventors: Yongjun Wu, San Jose, CA (US);
Jindrich Zejda, Saratoga, CA (US);
Elliott Delaye, San Jose, CA (US);
Ashish Sirasao, San Jose, CA (US)

(73) Assignee: XILINX, INC., San Jose, CA (US)

( * ) Notice: Subject to any disclaimer, the term of this patent is extended or adjusted under 35 U.S.C. 154(b) by 858 days.

(21) Appl. No.: 15/786,434

(22) Filed: Oct. 17, 2017

(65) Prior Publication Data
US 2019/0114548 A1 Apr. 18, 2019

(51) Int. Cl.
*G06N 3/086* (2023.01)
*G06F 9/38* (2018.01)
(Continued)

(52) U.S. Cl.
CPC ........... *G06N 3/086* (2013.01); *G06F 9/3844* (2013.01); *G06N 3/063* (2013.01); *G06N 20/00* (2019.01); *H04W 72/54* (2023.01); *G06N 3/045* (2023.01)

(58) Field of Classification Search
CPC ...... G06N 3/086; G06N 3/063; G06N 3/0454; G06N 20/00; G06N 20/10; G06N 3/045; H04W 72/54; G06F 9/3844
(Continued)

(56) References Cited

U.S. PATENT DOCUMENTS 4,766,560 A * 8/1988 Curry ........................ G06F 7/68
708/276
6,346,825 B1 2/2002 Pang et al.
(Continued)

FOREIGN PATENT DOCUMENTS

| CN | 106650922 A | 5/2017 |
| EP | 3153996 A2 | 4/2017 |
| JP | 20146650 A | 1/2014 |

OTHER PUBLICATIONS

Automated Systolic Array Architecture Synthesis for High Throughput CNN Inference on FPGAs (Year: 2017).*
(Continued)

*Primary Examiner* — Omar F Fernandez Rivas
*Assistant Examiner* — Shamcy Alghazzy
(74) *Attorney, Agent, or Firm* — Patterson + Sheridan, LLP

(57) ABSTRACT

Embodiments herein describe techniques for static scheduling a neural network implemented in a massively parallel hardware system. The neural network may be scheduled using three different scheduling levels referred to herein as an upper level, an intermediate level, and a lower level. In one embodiment, the upper level includes a hardware or software model of the layers in the neural network that establishes a sequential order of functions that operate concurrently in the hardware system. In the intermediate level, identical processes in the functions defined in the upper level are connected to form a systolic array or mesh and balanced data flow channels are used to minimize latency. In the lower level, a compiler can assign the operations performed by the processing elements in the systolic array to different portions of the hardware system to provide a static schedule for the neural network.

17 Claims, 11 Drawing Sheets

(51) Int. Cl.
  *G06N 3/045* (2023.01)
  *G06N 3/063* (2023.01)
  *G06N 20/00* (2019.01)
  *H04W 72/54* (2023.01)

(58) Field of Classification Search
  USPC .......................................................... 706/41
  See application file for complete search history.

(56) References Cited

U.S. PATENT DOCUMENTS

| | | | | |
|---|---|---|---|---|
| 7,245,615 | B1* | 7/2007 | Potter | H04L 69/168 370/413 |
| 9,110,726 | B2* | 8/2015 | Kotlyar | G06F 9/3885 |
| 9,710,748 | B2* | 7/2017 | Ross | G06N 5/04 |
| 9,747,546 | B2 | 8/2017 | Ross et al. | |
| 2008/0262984 | A1* | 10/2008 | Xu | G06F 16/334 706/12 |
| 2011/0125819 | A1* | 5/2011 | Mazahreh | G06F 17/16 708/607 |
| 2012/0257506 | A1* | 10/2012 | Bazlamacci | H04L 45/74591 709/212 |
| 2015/0074257 | A1* | 3/2015 | Harsha | G06F 8/45 709/223 |
| 2016/0210167 | A1* | 7/2016 | Bolic | G06F 9/45558 |
| 2017/0103299 | A1* | 4/2017 | Aydonat | G06N 3/0454 |
| 2018/0098083 | A1* | 4/2018 | McAllister | H04N 19/103 |
| 2018/0307980 | A1* | 10/2018 | Barik | G06F 9/3851 |
| 2018/0314936 | A1* | 11/2018 | Barik | G06N 3/084 |

OTHER PUBLICATIONS

Implementation of the Super-Systolic Array for Convolution (Year: 2003).*
High-Performance Systolic Arrays for Band Matrix Multiplication (Year: 2005).*
Chetlur, Sharan et al., "cuDNN: Efficient Primitives for Deep Learning," submitted Oct. 3, 2014, pp. 1-9, https://arxiv.org/pdf/1410.0759.pdf, Cornell University Library.
Di Carlo, Stefano et al., "An Area-Efficient 2-D Convolution Implementation on FPGA for Space Applications," Proc. of the 2011 IEEE 6th International Design & Test Workshop, Dec. 11, 2011, pp. 88-92, IEEE, Piscataway, New Jersey, USA.
Gysel, Philipp, "Ristretto: Hardware-Oriented Approximation of Convolutional Neural Networks," May 20, 2016, pp. 1-73, https://arxiv.org/abs/1605.06402, Cornell University Library.
Khronos, "clSetKernelArg," downloaded Sep. 22, 2017 from https://www.khronos.org/registry/OpenCL/sdk/1.0/docs/man/xhtml/clSetKernelArg.html, copyright 2007, pp. 1-4, Khronos Group, Beaverton, Oregon, USA.
Krizhevsky, Alex et al., "ImageNet Classification with Deep Convolutional Neural Networks," Proc. of the 12th International Conference on Neural Processing Systems, Dec. 3, 2012, pp. 1097-1105, ACM Digital Library, www.acm.org.
Mathworks, "im2col," dowloaded Sep. 22, 2017 from https://www.mathworks.com/help/images/ref/im2col.html?searchHighlight=im2col&s_tid=doc_srchtitle, pp. 1-3.
Saxena, Abhineet, "Convolutional Neural Networks (CNNs): An Illustrated Explanation," Jun. 20, 2016, downloaded Sep. 25, 2017 from http://xrds.acm.org/blog/2016/06/convolutional-neural-networks-cnns-illustrated-explanation/ pp. 1-15.
Shaaban, Muhammed, "Systolic Architectures, " Mar. 11, 2003, Kate Gleason College of Engineering, Rochester Institure of Technology, Rochester, New York, USA.
Stanford, "CS231n Convolutional Neural Networks for Visual Recognition," downloaded Sep. 25, 2017 from http://cs231n.stanford.edu/, pp. 1-23, Stanford University, Stanford, California, USA.
Warden, Pete, "Why GEMM is at the heart of deep learning," Apr. 20, 2015, pp. 1-9, downloaded from https://petewarden.com/2015/04/20/why-gemm-is-at-the-heart-of-deep-learning/.
Wikipedia, "Convolutional neural network," Sep. 20, 2017, pp. 1-13, downloaded from https://en.wikipedia.org/wiki/Convolutional_neural_network.
Wikpedia, "Matrix Multiplication," Sep. 20, 2017, pp. 1-19, downloaded from https://en.wikipedia.org/wiki/Matrix_multiplication.
Wikipedia, "Multiprocessing," May 10, 2017, pp. 1-4, dowloaded from https://en.wikipedia.org/wiki/Multiprocessing.
Wikipedia, "Producer-consumer problem," Sep. 7, 2017, pp. 1-9, downloaded from https://en.wikipedia.org/wiki/Producer%E2%80%93consumer_problem.
Wikipedia, "Row- and colum-major order," Aug. 23, 2017, pp. 1-5, downloaded from https://en.wikipedia.org/wiki/Row-_and_column-major_order.
Wikipedia, "Systolic array," Mar. 22, 2017, pp. 1-5, downloaded from https://en.wikipedia.org/wiki/Systolic_array.
Wikipedia, "Very long instruction word," Jul. 13, 2017, pp. 1-3, downloaded from https://en.wikipedia.org/wiki/Very_long_instruction_word.
Xilinx, "Smarter Data Center," downloaded Sep. 22, 2017 from https://www.xilinx.com/applications/data-center.html, pp. 1-4, Xilinx, Inc., San Jose, California, USA.
Xilinx, "SDSoC Development Environment," downloaded Sep. 22, 2017 from https://www.xilinx.com/products/design-tools/software-zone/sdsoc.html, pp. 1-16, Xilinx, Inc., San Jose, California, USA.
Xilinx, "UltraScale Architecture DSP Slice User Guide," UG579 (v1.3), Nov. 24, 2015, pp. 1-74, Xilinx, Inc., San Jose, California, USA.
Xilinx, "Vivado High-Level Synthesis," downloaded Sep. 22, 2017 from https://www.xilinx.com/products/design-tools/vivado/integration/esl-design.html, pp. 1-2, Xilinx, Inc., San Jose, California, USA.
Xilinx, "Deep Learning with INT8 Optimization on Xilinx Devices," WP486 (v1.0.1), Apr. 24, 2017, pp. 1-11, Xilinx, Inc., San Jose, California, USA.
Xilinx, "Implementing Memory Structures for Video Processing in the Vivado HLS Tool," XAPP793 (v1.0), Sep. 20, 2012, pp. 1-8, Xilinx, Inc., San Jose, California, USA.
Xilinx, "Two-Dimensional Linear Filtering," XAPP933 (v1.1), Oct. 23, 2007, pp. 1-8, Xilinx, Inc., San Jose, California, USA.
Akesson, Benny, "An inroduction to SDRAM and memory controllers," University Lecture, Eindhoven University of Technology, 2010, pp. 1-30, http://www.es.ele.tue.nl/premadona/files/akesson01.pdf.
Wikipedia, "Deep learning," Sep. 24, 2017, 23 pages, downloaded from https://en.wikipedia.org/wiki/Deep_learning.
Zhao Yangyang et al, "PIE: A Pipeline Energy-Efficient Accelerator to Interference Process in Deep Neural Networks", 2013 International Conference on Parallel and Distributed Systems, IEEE, Dec. 13, 2016 pp. 1067-1074.
Office Action from Korean Patent Application No. 10-2020-7013687 dated Apr. 28, 2023.
Office Action from Chinese Patent Application No. 201880076027.5 dated Dec. 28, 2023.
Wei, Xuechao, et al., "Automated Systolic Array Architecture Synthesis for High Throughput CNN Inference on FPGAs", DAC'17 Proceedings of the 54th Annurral design automation conference 2017.
Lee, Jae-Jin, et al., "Implementation of the Super-Systolic Array for Convolution", 2003 conference on Asia South Pacific Design automation (4 pages).

* cited by examiner

STATIC BLOCK SCHEDULING IN MASSIVELY PARALLEL SOFTWARE DEFINED HARDWARE SYSTEMS

TECHNICAL FIELD

Examples of the present disclosure generally relate to scheduling a massively parallel programmable hardware system.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tank) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

A modern field programmable gate array (FPGA) provides millions of look-up tables and thousands of configurable logic blocks (CLB), digital signal processing (DSP) and random access memory blocks (BRAM) that can be utilized to create massively parallel hardware systems. Existing FPGA systems are configured using either a hardware description language (HDL) or program code (e.g., C or C++) which is scheduled using a high level synthesis (HLS) tool.

In the HDL approach, all processes are scheduled manually with very complex state machines and data management logic. However, this process is time consuming for large scale FPGA systems. In a single thread software function, the complexity of scheduling thousands of processes grows exponentially and in some cases the scheduling is unable to converge.

SUMMARY

Techniques for scheduling a neural network are described. One example is a method which includes receiving a model defining a sequential order of a plurality of functions performed when executing at least one layer in the neural network where the neural network comprises a plurality of layers. The method includes receiving a systolic array for executing identical processes in the at least one layer of the neural network and compiling source code corresponding to the model and the systolic array into a hardware level design that provides a static schedule when executing the neural network in a hardware system.

Another example is a non-transitory computer-readable storage medium storing instructions, which when executed on one or more processing devices, perform an operation for scheduling a neural network. The operation includes receiving a model defining a sequential order of a plurality of functions performed when executing at least one layer in the neural network where the neural network comprises a plurality of layers. The operation includes receiving a systolic array for executing identical processes in the at least one layer of the neural network and compiling source code corresponding to the model and the systolic array into a hardware level design that provides a static schedule when executing the neural network in a hardware system.

Another example is a computing system that includes a processor and memory. The memory includes a compiler which, when executed by the processor performs an operation. The operation includes receiving a model defining a sequential order of a plurality of functions performed when executing at least one layer in the neural network where the neural network comprises a plurality of layers. The operation includes receiving a systolic array for executing identical processes in the at least one layer of the neural network and compiling source code corresponding to the model and the systolic array into a hardware level design that provides a static schedule when executing the neural network in a hardware system.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
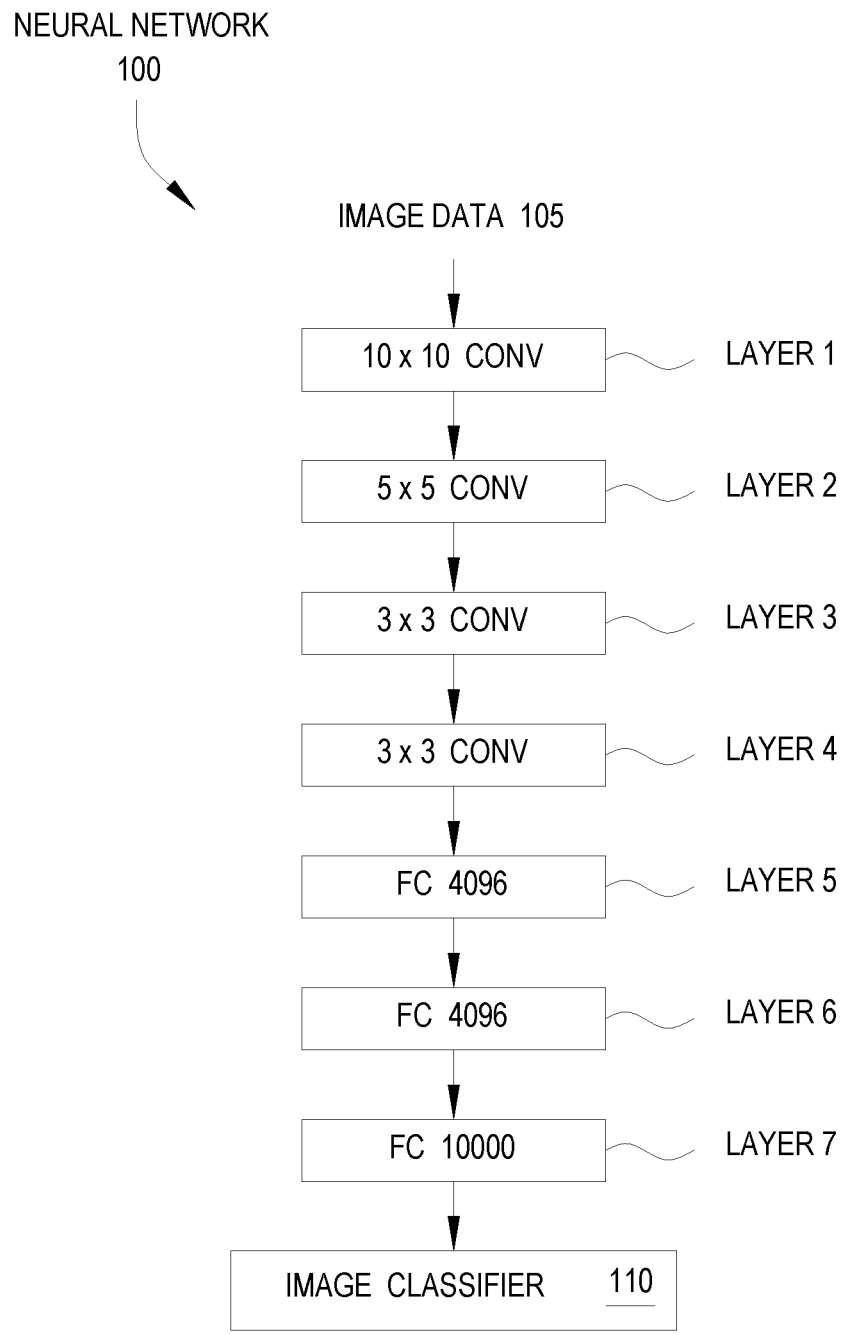
FIG. 1 illustrates a multi-layer neural network, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for statically scheduling a neural network implemented in a massively parallel hardware system. The neural network may be scheduled using three different levels referred to herein as an upper level, an intermediate level, and a lower level. In one embodiment, the upper level includes a hardware or software model of the layers in the neural network that establishes a sequential order of functions (e.g., convolution, max pooling/max pool, rectified linear units (ReLU), and scaling functions) that operate concurrently in the hardware system. The model may include data channels that interconnect the different functions in the layer.

In the intermediate level, identical processes in the layers defined in the upper level are connected to form a systolic array or mesh of processing elements and balanced data flow channels are used to minimize latency. In one embodiment, the systolic arrays are designed using source code (e.g., C or C++) which is parallelized by a HLS compiler when converting the source code into register transfer level (RTL) code which is then used to configure programmable hardware such as an FPGA. In the lower level, the HLS compiler can assign the operations performed by the processing elements in the systolic array to different portions of the programmable hardware. For example, if the processing element is implemented using different digital signal processing (DSP) blocks, the different operations performed by the processing element (e.g., read, write, multiple, add, etc.) can be performed in parallel. By dividing the scheduling of the neural network into different levels, a compiler can generate a parallelized pipeline such that the hardware elements in the system can operate concurrently.

FIG. 1 illustrates a multi-layer neural network 100, according to an example. As used herein, a neural network 100 is a computational module used in machine learning and is based on a large collection of connected units called artificial neurons where connections between the neurons carry an activation signal of varying strength. The neural network 100 can be trained from examples rather than being explicitly programmed. In one embodiment, the neurons in the neural network 100 are connected in layers—e.g., Layers 1, 2, 3, etc.—where data travels from the first layer—e.g., Layer 1—to the last layer—e.g., Layer 7. Although seven layers are shown in FIG. 1, the neural network 100 can include hundreds or thousands of different layers.

Neural networks can perform any number of tasks such as computer vision, feature detection, speech recognition, and the like. In FIG. 1, the neural network 100 detects features in a digital image such as classifying the objects in the image, performing facial recognition, identifying text, etc. To do so, image data 105 is fed into the first layer in the neural network which performs a corresponding function, in this example, a 10×10 convolution on the image data 105. The results of that function is then passed to the next layer—e.g., Layer 2—which performs its function before passing the processed image data to the next level, and so forth. After being processed by the layers, the data is received at an image classifier 110 which can detect features in the image data.

The layers are defined in a sequential order such that Layer 1 is performed before Layer 2, Layer 2 is performed before Layer 3, and so forth. Thus, there exists a data dependency between the lower layers and the upper layer(s). Although Layer 2 waits to receive data from Layer 1, in one embodiment, the neural network 100 can be parallelized such that each layer can operate concurrently. That is, during each clock cycle, the layers can receive new data and output processed data. For example, during each clock cycle, new image data 105 can be provided to Layer 1. For simplicity, assume that during each clock cycle a part of new image is provided to Layer 1 and each layer can output processed data for image data that was received in the previous clock cycle. If the layers are implemented in hardware to form a parallelized pipeline, after seven clock cycles, each of the layers operates concurrently to process the part of image data. The "part of image data" can be an entire image, a set of pixels of one image, a batch of images, or any amount of data that each layer can process concurrently. Thus, implementing the layers in hardware to form a parallel pipeline can vastly increase the throughput of the neural network when compared to operating the layers one at a time. The timing benefits of scheduling the layers in a massively parallel hardware system improve further as the number of layers in the neural network 100 increases.

Figure 2:
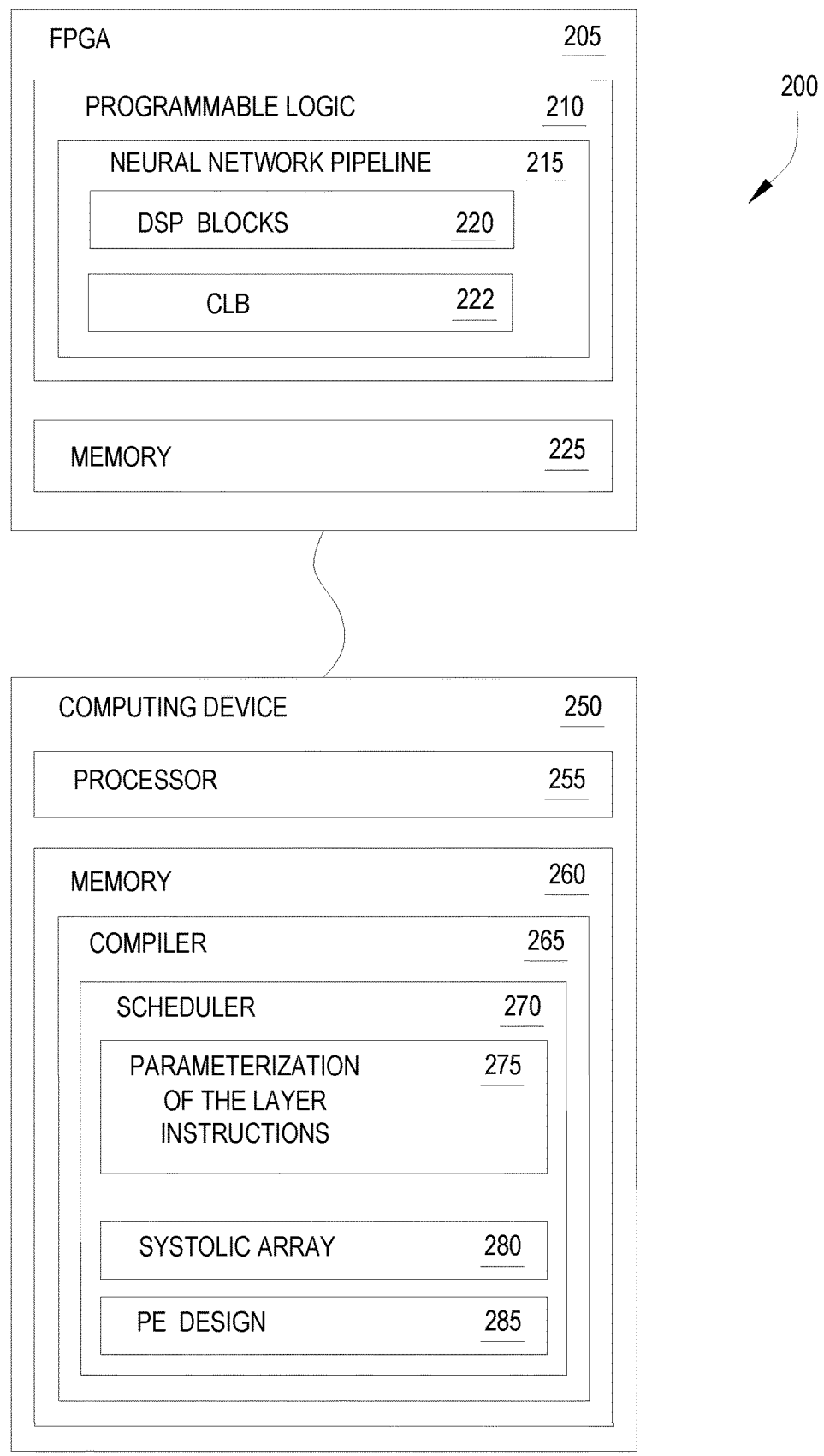
FIG. 2 is a system for establishing a neural network pipeline in an FPGA, according to an example.

FIG. 2 is a system 200 for establishing a neural network pipeline 215 in an FPGA 205, according to an example. In addition to the FPGA 205, the system 200 includes a computing device 250 which configures programmable logic 210 in the FPGA 205. For example, the computing device 250 can be a laptop, desktop, or server. The computing device 250 includes a processor 255 which represents any number of processing elements which each can contain any number of processing cores. The device 250 also includes a memory 260 which can have volatile or non-volatile memory elements.

The memory 260 includes a compiler 265 which, in one embodiment, is a software application (e.g., an HLS compiler) that converts source code such as C or C++ into RTL code which configures the programmable logic 210 to establish the neural network pipeline 215. When compiling the source code, the compiler 265 uses a scheduler 270 to generate RTL which statically schedules the neural network pipeline 215 such that the different hardware elements forming the pipeline 215 (e.g., DSP blocks 220 or CLBs 222) can operate concurrently. In one embodiment, the static schedule is fixed so that the order in which the hardware elements execute does not change during runtime. In one embodiment, the scheduler 270 receives or generates an upper level, an intermediate level, and lower level which the compiler 265 uses to generate statically scheduled RTL code for establishing the neural network pipeline 215. In one embodiment, the upper level of the schedule is a layer design which includes a hardware or software model of a layer (or multiple layers) in the neural network. The layer design can be defined by parameterizations of the layer instructions 275 which can be a sequential order of a plurality of functions in the layer that can operate concurrently such as convolution, max pooling, ReLU, and scaling functions.

In one embodiment, the intermediate level of the schedule is a systolic array 280 which includes a plurality of processing elements (PEs) that are interconnected using data channels. In one embodiment, each of the PEs includes one or more of the DSP blocks 220 or one or more CLBs 222 (or a combination of both) in the FPGA. The DSP blocks 220 are specialized logic blocks that can perform DSP at faster rates than CLBs 222 and lower system power consumption. Moreover, adding the DSP blocks 220 can reduce the overall size of the FPGA since achieving the same DSP performance using CLBs 222 would result in larger integrated circuits. The DSP blocks 220 include adders, pre-adders, sub-tractors, accumulators, summation units, and the like.

The systolic array 280 defines how the DSP blocks 220 or CLB 222 forming the PEs are interconnected in order to perform a function defined in the layer. For example, to perform convolution, the systolic array 280 may include a plurality of interconnected PEs that in turn each includes multiple multiply-accumulator (MAC) blocks formed from the programmable DSP blocks 220 in the FPGA 205. In another embodiment, when implementing the max pooling or ReLU functions, the PEs may include CLBs 222 which perform the corresponding operations. Like the functions defined in the parameterization of the layer instructions 275, the compiler 265 can generate RTL code corresponding to the systolic array 280 such that the PEs can operate concurrently.

In one embodiment, the lower level of the schedule is a PE design 285 which defines the operations performed by the PEs in the systolic array 280. Continuing the example above, if the PEs include MAC blocks, the PE design 285 can list the read, write, multiple, and add operations performed by the these blocks. Of course, MAC blocks are just one example of implementing a PE and other operations may be performed by PEs that are part of a max pooling unit or ReLU.

The FPGA 205 includes the programmable logic 210 and memory 225. The programmable logic 210 can include an array of programmable logic blocks and a hierarchy of reconfigurable interconnects that enable the logic blocks to be communicatively coupled. One example of the programmable logic blocks includes the DSP blocks 220 which are useful when performing convolutions or fully connected layers in the neural network pipeline 215. The programmable logic blocks can also include one or more CLBs 222 which may be used when performing scaling or max pool functions. In one embodiment, the neural network pipeline 215 includes programmable logic 210 for converting received image data into a 2D matrix (referred to as im2col) so that matrix multiplication can be used to perform convolution.

Although an FPGA 205 is shown, the scheduling techniques described herein can be performed to implement the neural network pipeline 215 on other types of non-programmable hardware system such as a graphics processor unit (GPU) or an application specific integrated circuit (ASIC) specially designed to implement a neural network. That is, when designing or implementing a neural network on these systems, the parameterizations of the layer instructions 275, systolic array 280, and the PE design 285 can be used such that the hardware elements are statically scheduled such that the hardware elements can operate concurrently.

Figure 3:
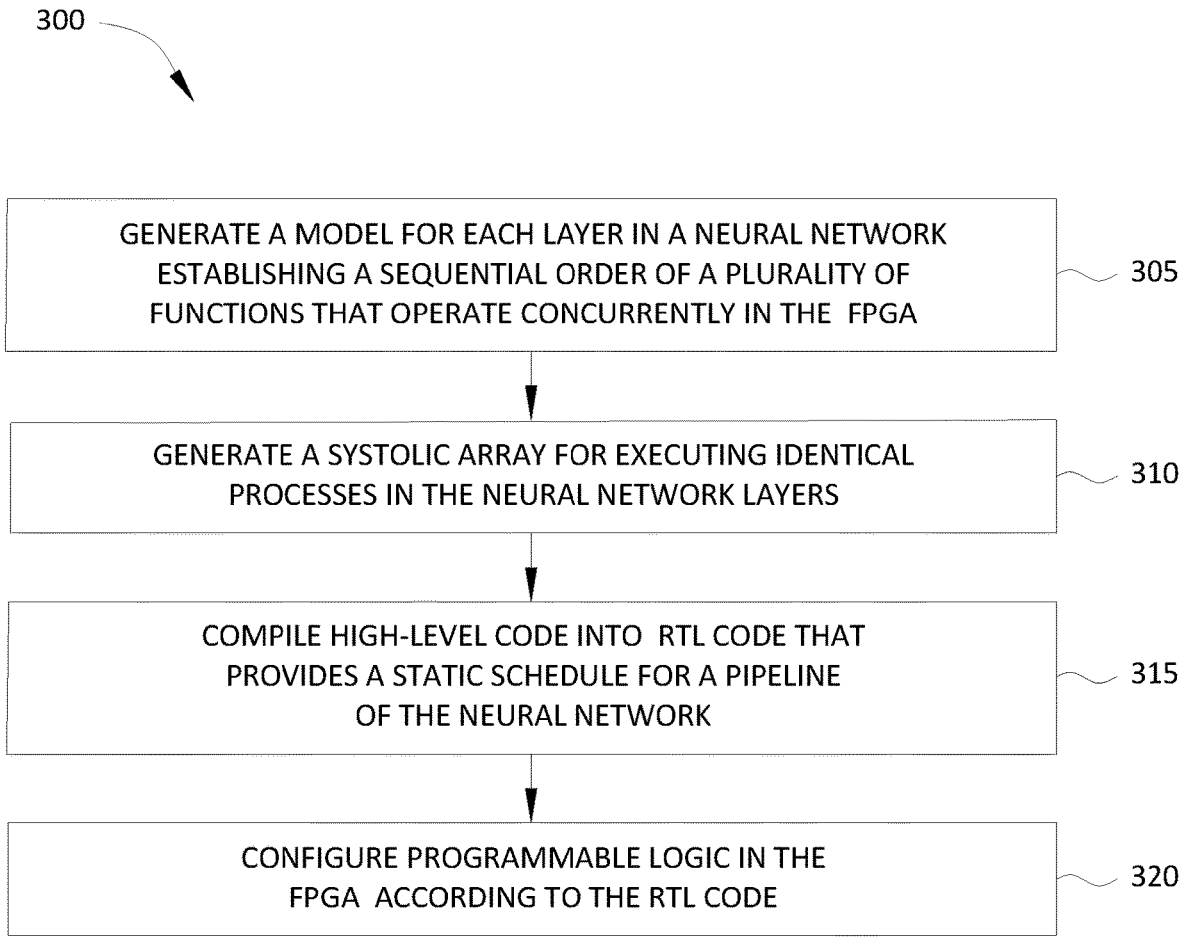
FIG. 3 is a flowchart for scheduling a neural network pipeline, according to an example.

FIG. 3 is a flowchart of a method 300 for scheduling a neural network pipeline, according to an example. At block 305, the scheduler receives a model for the layers in a neural network establishing a sequential order of a plurality of functions that operate concurrently in the FPGA. In one embodiment, the model is a layer design as described in FIG. 2 which includes parameterizations of the layer instructions 275. Further, the model can be a software or a hardware model that represents the complete neural network as implemented in the massively parallel hardware system—e.g., an FPGA.

In one embodiment, the model is provided to the scheduler by a user. For example, the user may design the model according to the type of neural network the user desires to implement on the FPGA. For example, different neural networks can have different layers and functions within those layers. As mentioned above, neural networks can be designed to perform different tasks such as feature detection in digital images, audio processing, or processing text. Non-limiting examples of neural networks include CNN, RNN, long short-term memory (LSTM) neural networks, and neural networks that use feature base learning or supervised/unsupervised learning. Moreover, the structure of the same type of neural networks can vary widely. For example, some CNNs can include tens of layers while others can include hundreds of layers where each of the layers can be configured differently—e.g., a layer that performs 3×3 convolution, a layer that performs 11×11 convolution, a fully connected (FC) layer, a pooling layer, etc.

Figure 4:
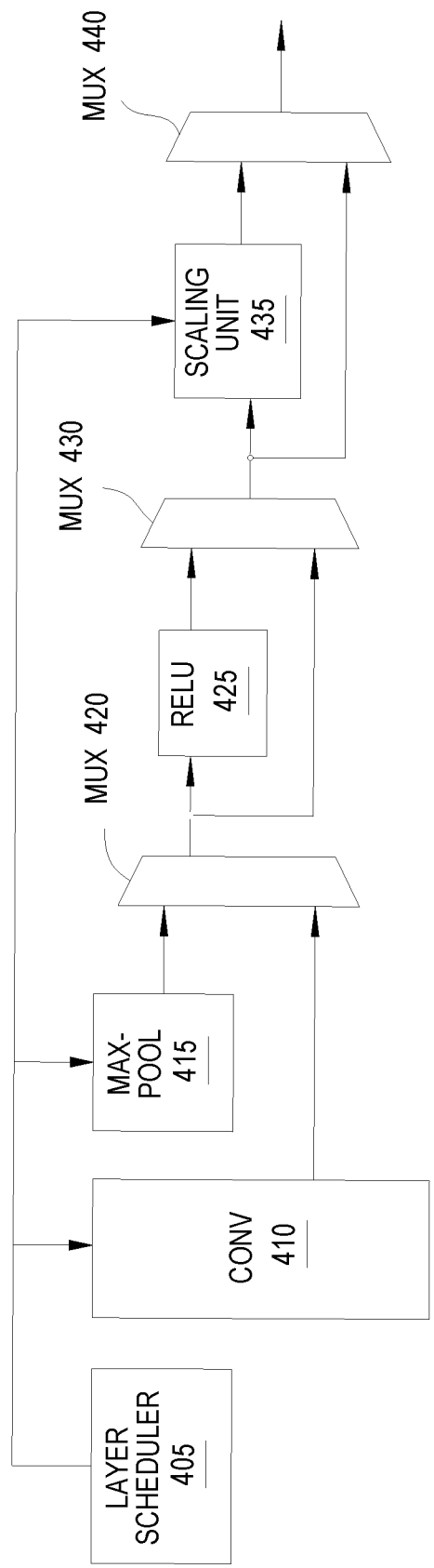
FIG. 4 illustrates a hardware model of the layers in a neural network, according to an example.

In one embodiment, the model defines the upper level schedule for each of the layers in the neural network. FIG. 4 illustrates a hardware model of an architecture description 400 of the layers in a neural network, according to an example. The architecture description 400 includes a layer scheduler 405, a convolution unit 410, a max-pooling unit 415, a multiplexer (mux) 420, a ReLU 425, a mux 430, a scaling unit 435, and a mux 440 for performing feature detection in an image which are referred to generally as pipelined functions. The model of the architecture description 400 defines a sequential order of the pipelined functions when executing one or more layers of the neural network. In one embodiment, the convolution unit 410 performs matrix multiplication using a matrix multiplier and weights received image data using any number of weights (or kernels). In one embodiment, the max-pooling unit 415 amplifies features in the image so the features are not lost when the image is scaled later in the pipeline. The ReLU 425 is a type of activation unit or ramp function which, in one embodiment, is defined as $f(x)=\max(0,x)$ where x is the output from a neuron. The scaling unit 435 can adjust the values of the processed data to minimize numerical errors due to quantization.

The layer scheduler 405 determines where the data flow starts. For example, for some layers, the input image data may first be sent to the convolution unit 410. In other layers in the neural network, the image data bypasses the convolution unit 410 and instead is sent by the layer scheduler 405 to the max-pooling unit 415 or the scaling unit 435. Furthermore, the manner in which the data propagates through the architecture description 400 can vary depending on the layer. For example, for a first layer, after the image data is processed by the convolution unit 410, the mux 420 may forward the processed data directly to the ReLU 425 thereby bypassing the max-pooling unit 415. Alternatively, in a second layer, the data outputted by the convolution unit 410 is first processed by the max-pooling unit 415 before the mux 420 transmits the data to the ReLU 425. In this manner, the multiplexers 420, 430, and 440 can alter how the image data flows through the architecture description 400 according to control signals provided by, e.g., the layer scheduler 405.

In one embodiment, the architecture description 400 is a block diagram illustrating the complete system needed to execute a neural network. Put differently, the architecture description 400 represents, at an abstracted level, the hardware blocks needed in an FPGA (or other hardware system) to execute the neural network and its corresponding layers. Although not shown, the architecture description 400 may include dataflow channels inserted between different blocks to allow the blocks to execute concurrently. The dataflow channels can be properly sized to minimize the overall system latency. Moreover, the architecture description 400 illustrated in FIG. 4 can be software defined meaning the user simply expresses a sequence of scalar operations (represented here as the different blocks) and adds parallelization pragmas. That is, the user can define the sequence at which the blocks are executed without scheduling these blocks (i.e., without defining when the blocks should be executed). In one embodiment, the parallelization pragma is a directive pragma which specifies to the compiler that the defined blocks should be scheduled to operate in parallel. By converting the hardware model shown in FIG. 4 into source code and using the parallelization pragma, the compiler can create an optimal static schedule for executing architecture description 400. In one embodiment, the resulting static schedule enables the different blocks shown in FIG. 4 to execute concurrently.

Rather than expressing the architecture description 400 as a hardware model, the architecture description 400 can be represented as a software model. On example of a C++ implementation of a software model for the architecture description 400 is provided in Table 1.

TABLE 1

```
for (unsigned int L = 0; L < p_cnnLayers; ++L) {
    #pragma HLS DATAFLOW
    p_kArgs.LoadFromDdr(p_K, L);
    KlnsKargsVars p_kVars = p_kVars.getKargVars( );
    assert(p_kVars.getCnnLayers( ) >= L+1);
    Conv(L, p_kVars, ...);
    MaxPool(L, p_kVars, ...);
    Relu(L, p_kVars, ...);
    Scale(L, p_kVars, ...);
}
```

The source code in Table 1 is untimed functional code for a neural network with "cnnLayers" number of layers. Further, the code is ordered in a defined sequence but is not explicitly scheduled. In this embodiment, the HLS DATAFLOW is a parallelization pragma for the dataflow. This pragma permits the neural network designer to use a RTL concept by instantiating parallel blocks without having to schedule the blocks. After compiled into RTL, the different functions in the code (e.g., Cony, MaxPool, Relu, and Scale) operate concurrently. Although not shown, the code may include FIFOs (or other buffers) which interconnect the different functions.

The resulting compiled RTL generated from the code shown in Table 1 contains a statistically scheduled state machine for all layers of the neural network. Within each layer, all the blocks (or functions) run concurrently. The hardware model illustrated in FIG. 4 and the software code in Table 1 illustrate the ease with which a designer can express hardware behavior in a high level software defined system.

Returning to method 300, at block 310 the scheduler receives a systolic array for executing identical processes in the neural network layers. In one embodiment, the designer provides software code which defines the configuration of the systolic array which the scheduler (or the compiler) then parallelizes such that the different operations in the systolic array execute concurrently in hardware.

In one embodiment, the systolic array is a two dimensional array which simplifies overall scheduling as well as maintains consistent data flow to make placing and routing in the hardware system easier. In one embodiment, the systolic array includes a plurality of PEs that is interconnected in order to execute concurrently. For example, each PE can be a multiple-accumulator (MAC) block. However, the PE can vary depending on the processes performed by the systolic array. For example, a systolic array used to perform convolution may have MAC blocks while a systolic array used to perform pooling, ReLU, or scaling have different PEs. By arranging the PEs in a multi-dimensional array, each of the PEs can receive an exponentially larger bandwidth data path. The two dimensional mesh shown here provides a compromise between bandwidth and difficulty of placement and routing.

Figure 5:
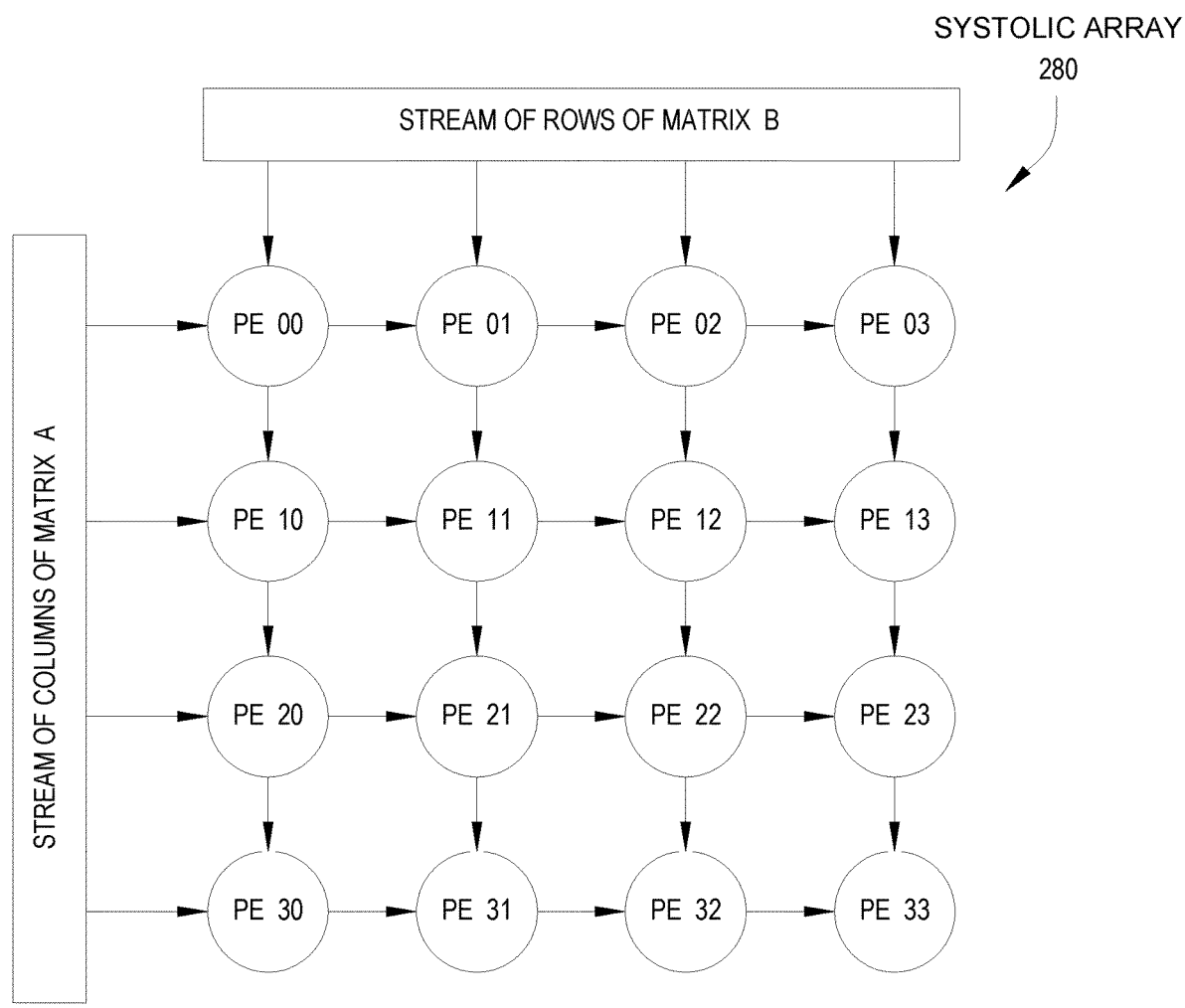
FIG. 5 illustrates a systolic array for performing convolution or fully connected layers in a neural network, according to an example.

FIG. 5 illustrates a systolic array 280 in a neural network, according to an example. In FIG. 5, the systolic array 280 is configured as a convolution block. In one embodiment, the convolution unit 410 illustrated in FIG. 4 is formed from one or more of the systolic arrays 280 shown in FIG. 5. The other blocks in FIG. 5—i.e., the max-pooling unit 415, ReLU 425, and the scaling unit 435—may be formed using a same systolic array 280 or different systolic arrays.

In FIG. 5, the two dimensional systolic array 280 includes a plurality of PEs that are interconnected to form a 4×4 matrix. In one embodiment, the scheduler forms the systolic array 280 using software code provided by the user or designer. In this example, the systolic array 280 can be derived from a for loop (and optional unroll pragmas for the HLS compiler) which performs the multiplication of A×B for N number of times. The scheduler then generates the systolic array 280 illustrated in FIG. 5 which includes performing the matrix multiplication of matrices formed from the A and B inputs.

In this example, the four top PEs—i.e., PEs 00, 01, 02, and 03—receive data from a B operand matrix while the four leftmost PEs—i.e., PEs 00, 10, 20, and 30—receive data from an A operand matrix. In one embodiment, the scheduler generates synchronization signals which synch the PEs so that each individual PEs performs its function concurrently with the others. In one embodiment, the PEs receive input during each clock cycle and provide an output each clock cycle. The PEs may need one clock cycle to process received data or use multiple clocks cycles to process received data. In any case, the PEs can be scheduled such that during each clock cycle some operation is being performed on received data.

In one embodiment, the PEs in the array 280 exchange data using buffers. For example, FIFOs may be disposed at each of the locations where the PEs exchange data as indicated by the arrows. Moreover, the FIFOs can be part of data flow channels which are balanced to minimize latency. In one embodiment, the PEs are expressed as software defined stream classes.

As illustrated in FIG. 5, the scheduler can receive software code that defines a systolic array (e.g., the "for loop" described above) which the scheduler can convert into the parallelized systolic array 280. For example, the software definition provided by the user can include an expression that includes a single PE or core which the scheduler unpacks into the systolic array 280 or mesh of PEs shown in FIG. 5.

Returning to FIG. 4, at block 315 the compiler compiles high-level code into RTL code that provides a static schedule for a pipeline of the neural network. In one embodiment, the compiler uses source code corresponding to the model received at block 305 and the systolic array received at block 310 to generate the RTL code. For example, the compiler can schedule the individual blocks in the model or layer design rather than attempting to schedule the entire neural network as a whole. Referring to FIG. 4, the compiler can separately schedule the convolution unit 410, max-pooling unit 415, ReLU 425, and the scaling unit 435 in order to simplify the scheduling processing and increase the likelihood that the scheduling converges. That is, by scheduling the individual blocks, the compiler can schedule the hardware forming the blocks and then generate data flow channels for sharing data between the blocks when performing the upper level of the scheduling process.

When scheduling the individual blocks in the upper level, the compiler can divide the blocks into one or more systolic arrays. That is, the systolic arrays represent the intermediate level of scheduling which further subdivides the blocks in the upper level—i.e., the functional blocks in the architecture description 400. In one embodiment, the systolic arrays are used when identical processes are being performed in the functional block (such as convolution which relies on performing multiple multiplications). Put differently, because convolution can be performed using the same PEs (e.g., the same MAC blocks), these PEs can be arranged into the multi-dimensional systolic array 280 which operate in parallel. In contrast, in one embodiment, different processes in the blocks in the upper level are connected with data flow channels and scheduled during the lower level of scheduling without forming systolic arrays or meshes.

During the lower level of scheduling, the compiler schedules the hardware blocks forming the processes and functions in the upper and intermediate levels of the schedule. For example, the PEs forming the blocks in the architecture design shown in FIG. 4 and the systolic arrays can be divided into hardware elements which are then scheduled by the compiler. In one embodiment, the scheduler can pipeline the operations of the hardware elements so that these elements receive input operands and produce an output every clock cycle. By subdividing scheduling into multiple levels, the compiler and scheduler can generate hardware level code (e.g., RTL code) which configures a hardware system such that the different blocks, software functions/methods, and processing elements operate concurrently.

Figure 6:
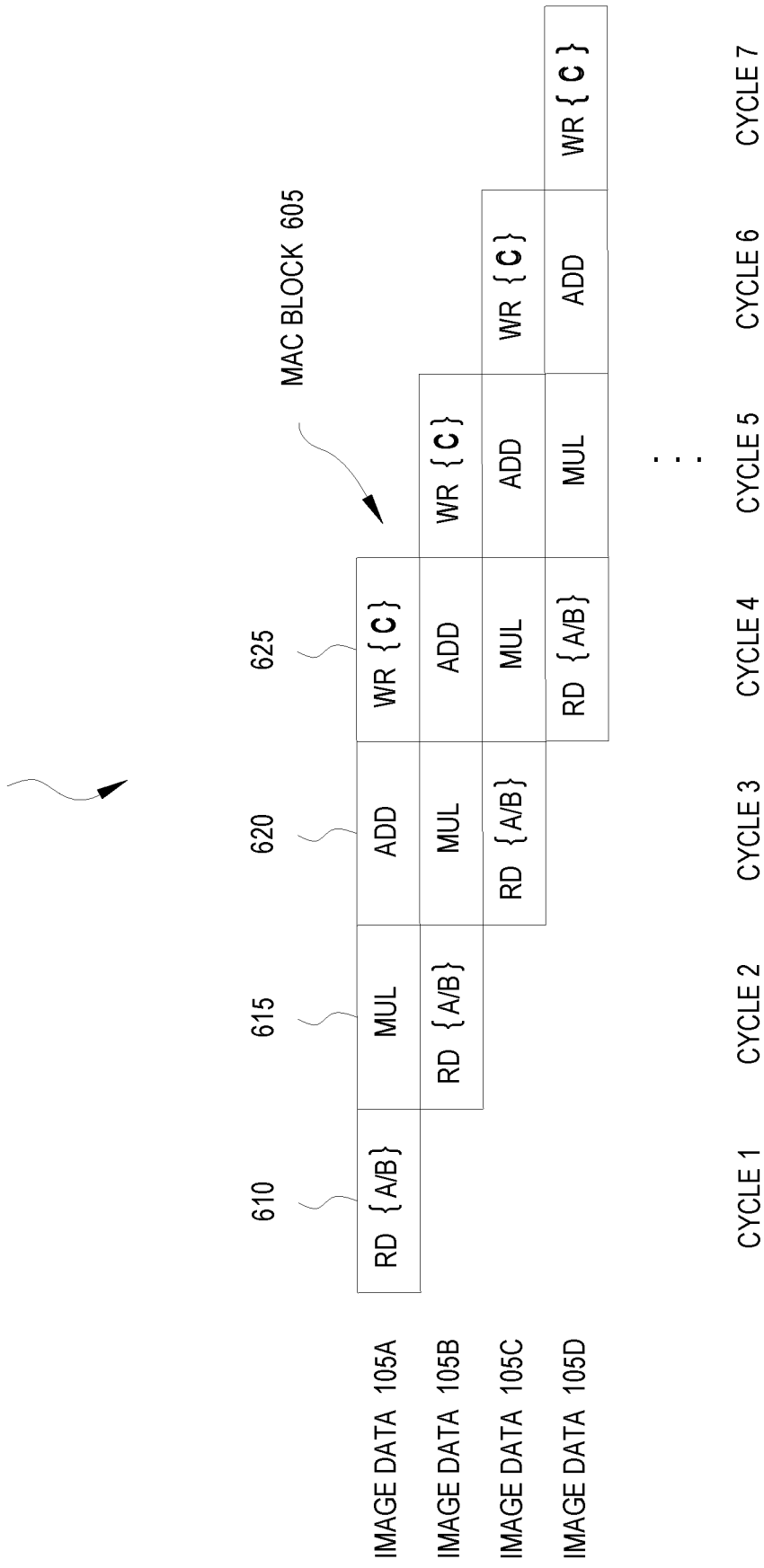
FIG. 6 illustrates a pipelined processing element in a digital signal processing block, according to an example.

FIG. 6 illustrates a pipelined PE 600 in a digital signal processing block, according to an example. In this embodiment, the PE 600 is a MAC block 605 for performing convolution, but can be any hardware element or elements. In FIG. 6, the MAC block 605 performs a floating point operation which cannot be performed in a single clock cycle. As such, an HLS compiler can divide this floating point operation into sub-operations that can each be performed in one clock cycle. Here, the floating point operation can be performed in four clock cycles by first performing a read operation 610, followed by a multiple operation 615, followed by an addition operation 620, and a write operation 625.

In the first clock cycle, the read operation 610 retrieves the operands A and B. In the second clock cycle, the multiply operation 615 multiplies the A operand with the B operand. In the third clock cycle, the addition operation 620 adds the result of this multiplication to the previous multiplication acting as an accumulation operation. In the fourth clock cycle, the write operation writes the result of the addition operation (e.g., output C) to a memory. In this manner, the overall operation of the MAC block 605 can be divided into multiple steps that can be completed during each clock cycle.

In one embodiment, to perform the operations 610, 615, 620, and 625 in parallel or concurrently, the operations are performed by different hardware elements in the FPGA. That is, the read operation 610 may be performed by a first memory interface hardware element while the write operation 625 is performed by a second memory interface hardware element. As long as these hardware elements are attempting to read from and write to separate memories (i.e., different Block RAM (BRAM) elements in the FPGA are assigned to store the operands A and B and the output C), the read and write operations 610 and 625 can be performed concurrently. Similarly, the multiply operation 615 can be performed by a first DSP block while the addition operation 620 is performed by a second DSP block so that these operations can be performed concurrently.

FIG. 6 illustrates the status of the PE 600 during seven clock cycles (i.e., Cycle 1, 2, 3, 4, 5, 6, and 7) during which the PE 600 processes four chunks or packets of image data (i.e., image data 105A-D). During Cycle 1, the operands A and B corresponding to image data 105A are read from memory in the FPGA. During Cycle 2, the operands A and B corresponding to image data 105A are multiplied at the same time the operands A and B corresponding to image data 105B are read from memory. During Cycle 3, the results of performing the multiplication on the image data 105A are added by the addition operation 620 at the same time the operands A and B corresponding to image data 105B are multiplied and the operands A and B corresponding to image data 105C are read from memory. By Cycle 4, all of the hardware elements making up the PE 600 execute concurrently. In this example, at Cycle 4, the results of performing the addition for the image data 105A are written into the memory of the FPGA while the results of performing the multiplication on the image data 105B are added, the operands A and B corresponding to image data 105C are multiplied, and the operands A and B corresponding to image data 105D are read from memory. As long as additional image data is available (i.e., there is more image data in the neural network pipeline that needs to be processed by the PE 600), the hardware elements execute concurrently. Put differently, the compiler can schedule the hardware elements into a pipeline using the hardware elements in the FPGA such that the hardware elements operate concurrently. Because the compiler can perform a similar scheduling process for all the hardware elements in the upper, intermediate, and lower levels of the schedule, the neural network pipeline as a whole can be schedule such that the hardware elements operate concurrently.

Returning to method 300, at block 320, the computing device configures programmable hardware logic in the FPGA according to the RTL code generated at block 315. That is, the computing device configures the FPGA such that the hardware elements selected to perform the PEs shown in FIG. 6 can operate concurrently. Moreover, the RTL code can define data flow channels between the hardware elements which may include buffers. Although RTL is specifically mentioned, the compiler (or a synthesis tool) could generate any kind of hardware level design which provides a static schedule when executing the neural network in a hardware system such as a GPU or ASIC.

Figure 7:
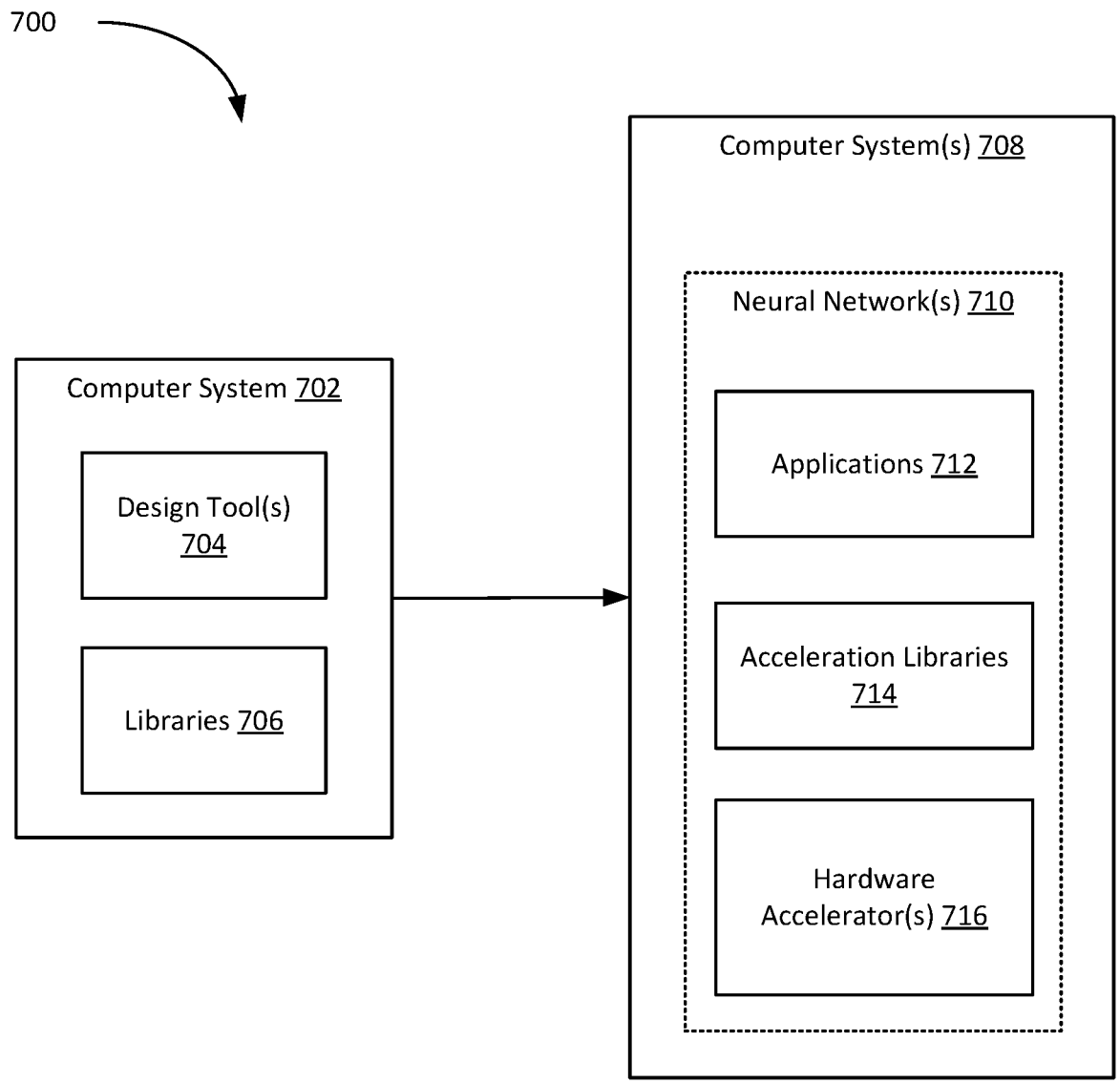
FIG. 7 is a block diagram depicting a system for implementing neural networks according to an example.

FIG. 7 is a block diagram depicting a system 700 for implementing neural networks according to an example. The system 700 includes a computer system 102 and one or more computer systems 708. The computer system 702 includes conventional computing components configured to execute software that provides one or more design tools 704. Each computer system 708 executes one or more neural networks 710. The neural network(s) 710 are implemented using applications 712, acceleration libraries 714, and one or more hardware accelerators 716.

In an example, the hardware accelerator(s) 716 include programmable ICs, such as FPGAs. The acceleration libraries 714 provide application programming interfaces (APIs) to interface with the hardware accelerator(s) 716. The acceleration libraries 714 can also include libraries that provide neural network functions, including predefined and optimized implementations of neural network layers and other types of neural network structures. Thus, the neural network(s) 710 can include both hardware portions implemented in the hardware accelerator(s) 716, as well as software portions implemented in the acceleration libraries 714. The applications 712 invoke the APIs of the acceleration libraries 714 to program and control the hardware accelerator(s) 716 to implement the neural network(s) 716.

A designer interacts with the design tool(s) 704 to define the neural network(s) 710. The design tool(s) 704 can generate files for programming the hardware accelerator(s) 716 (e.g., configuration bit streams for FPGAs), files that provide the acceleration libraries 714, and files that provide the applications 712. The designer can define the hardware portions of the neural network(s) 710 using a register transfer language (RTL) or using a programming language, such as C, C++, OpenCL, and the like, or a combination of RTL and programmable language(s). The user can define the software portions of the neural network(s) 710 using a programming language, such as C, C++, OpenCL, etc. The design tool(s) 704 compile the software-defined neural networks to generate files for programming the hardware accelerator(s) 716 and library files for the acceleration libraries 714. The designer can make use of libraries 706 that provide class libraries, template libraries, and the like to assist in developing the hardware and software portions of the neural network(s) 710.

A user can define the applications 712 using a programming language (e.g., C, C++, Python, etc.). The user can make use of neural network frameworks and libraries, such as Caffe, TensorFlow, MXNet, and the like.

Figure 8:
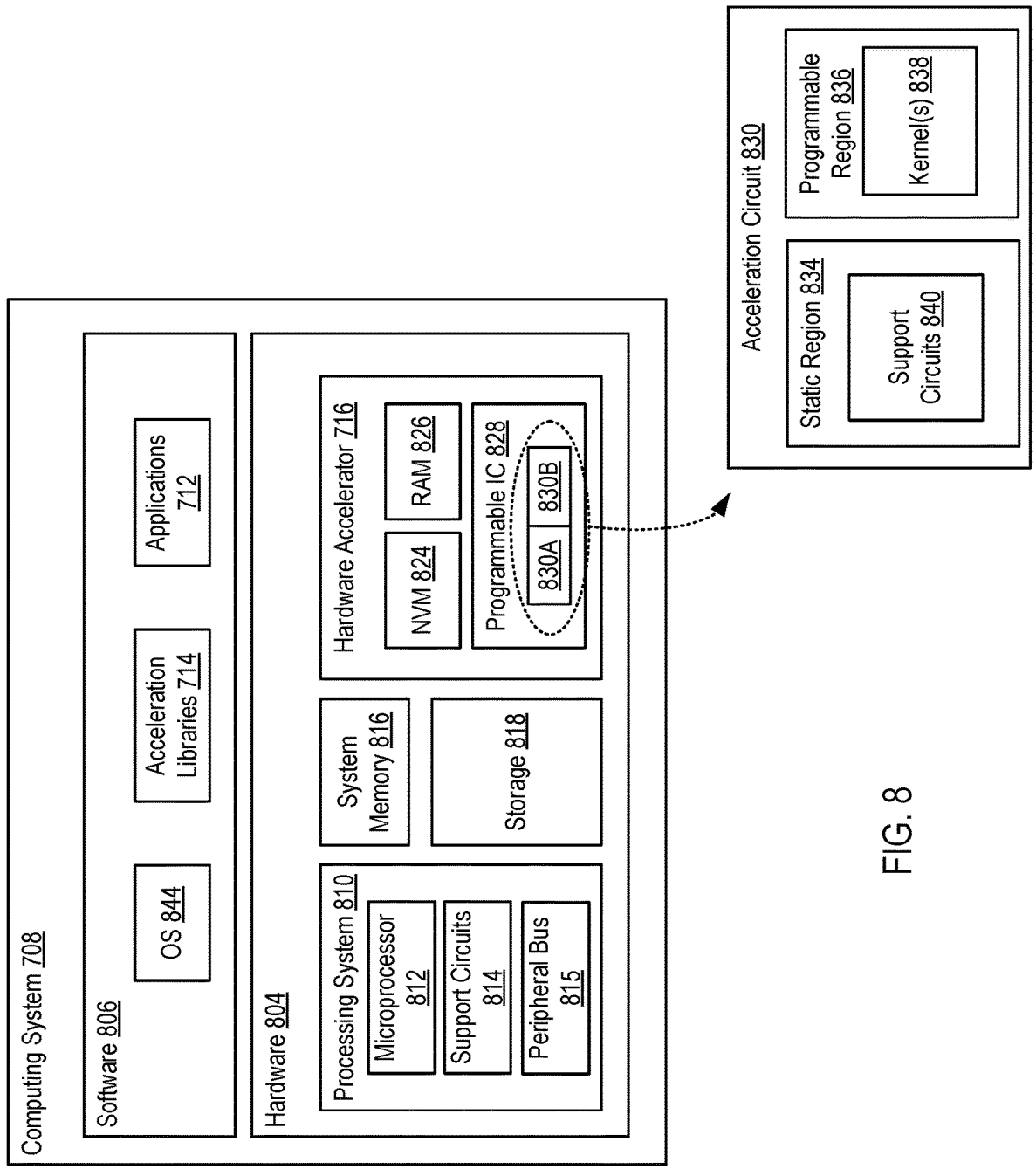
FIG. 8 is a block diagram depicting a computing system according to an example.

FIG. 8 is a block diagram depicting a computing system 708 according to an example. The computing system 708 includes hardware 804 and software 806 executing on the hardware 804. The hardware 804 includes a processing system 810, system memory 816, storage devices ("storage 818"), and a hardware accelerator 716. The software 806 includes an operating system (OS) 844, the acceleration libraries 714, and the applications 712.

The processing system 810 includes a microprocessor 812, support circuits 814, and a peripheral bus 815. The microprocessor 812 can be any type of general-purpose central processing unit (CPU), such as an x86-based processor, ARM®-based processor, or the like. The microprocessor 812 can include one or more cores and associated circuitry (e.g., cache memories, memory management units (MMUs), interrupt controllers, etc.). The microprocessor 812 is configured to execute program code that perform one or more operations described herein and which can be stored in the system memory 816 and/or the storage 818. The support circuits 814 include various devices that cooperate with the microprocessor 812 to manage data flow between the microprocessor 812, the system memory 816, the storage 818, the hardware accelerator 716, or any other peripheral device. For example, the support circuits 814 can include a chipset (e.g., a north bridge, south bridge, platform host controller, etc.), voltage regulators, firmware (e.g., a BIOS), and the like. The support circuits 814 manage data flow between the microprocessor 812 and the peripheral bus 815, to which various peripherals, such as the hardware accelerator 716, are connected. In some examples, the microprocessor 812 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 810 is shown separate from the hardware accelerator 716. In other examples discussed further below, the processing system 810 and the hardware accelerator 716 can be implemented on the same IC using a System-On-Chip (SoC).

The system memory 816 is a device allowing information, such as executable instructions and data, to be stored and retrieved. The system memory 816 can include, for example, one or more random access memory (RAM) modules, such as double-data rate (DDR) dynamic RAM (DRAM). The storage device 818 includes local storage devices (e.g., one or more hard disks, flash memory modules, solid state disks, and optical disks) and/or a storage interface that enables the computing system 708 to communicate with one or more network data storage systems. The hardware 804 can include various other conventional devices and peripherals of a computing system, such as graphics cards, universal serial bus (USB) interfaces, and the like.

The hardware accelerator 716 includes a programmable IC 828, a non-volatile memory 824, and RAM 826. The programmable IC 828 can be an FPGA or the like or a SoC having an FPGA or the like. The NVM 824 can include any type of non-volatile memory, such as flash memory or the like. The RAM 826 can include DDR DRAM or the like. The programmable IC 828 is coupled to the NVM 824 and the RAM 826. The programmable IC 828 is also coupled to the peripheral bus 815 of the processing system 810.

The OS 814 can be any commodity operating system known in the art, such as such as Linux®, Microsoft Windows®, Mac OS®, or the like. The acceleration libraries 714 includes drivers and libraries that provide APIs for command and control of the hardware accelerator 716. The applications 712 include software executing on the microprocessor 812 that invokes the APIs of the acceleration libraries 714 to implement neural network(s).

In operation, the programmable IC 828 is configured with an acceleration circuit 830 (e.g., a neural network acceleration circuit or kernel acceleration circuit). The acceleration circuit 830 generally includes a base platform 830A and a kernel 830B. For example, the acceleration circuit 830 can be implemented using a static region 834 and a programmable region 836. The static region 834 includes support circuits 840 for providing an interface to the peripheral bus 815, the NVM 824, and the RAM 826. The programmable region 836 can include one or more kernel circuits ("kernel(s) 838"). The base platform 830A is implemented using the static region 834, and the kernel 830B is implemented using the programmable region 836. In another example, the base platform 830A can also be implemented using a portion of the programmable region 836. Thus, in some examples, the programmable region 836 also includes some interface circuits. In some examples, the acceleration circuit 830 can include more than one programmable region 836, each of which can be individually configured with kernel(s) 838.

The static region 834 is "static" in that the circuitry thereof remains constant across reconfigurations of the programmable region 836 and is different from the static scheduling discussed above. In an example, the support circuits 840 include PCIe endpoint circuits, a direct memory access (DMA) controller, interconnects, a memory controller, a memory interface circuit (e.g., a DDR interface), decoupler circuits (to support partial reconfiguration), flash programmer, debug circuits, and the like. In some examples, the programmable region 836 does not include any of the support circuits 840. In other examples, some support circuits are implemented in the programmable region 836. In such case, the programmable region 836 can be referred to as an "expanded programmable region." In either case, in one example, some support circuits 840 are always present in the static region 834, such as the PCIe circuits and the DMA circuits.

Figure 9:
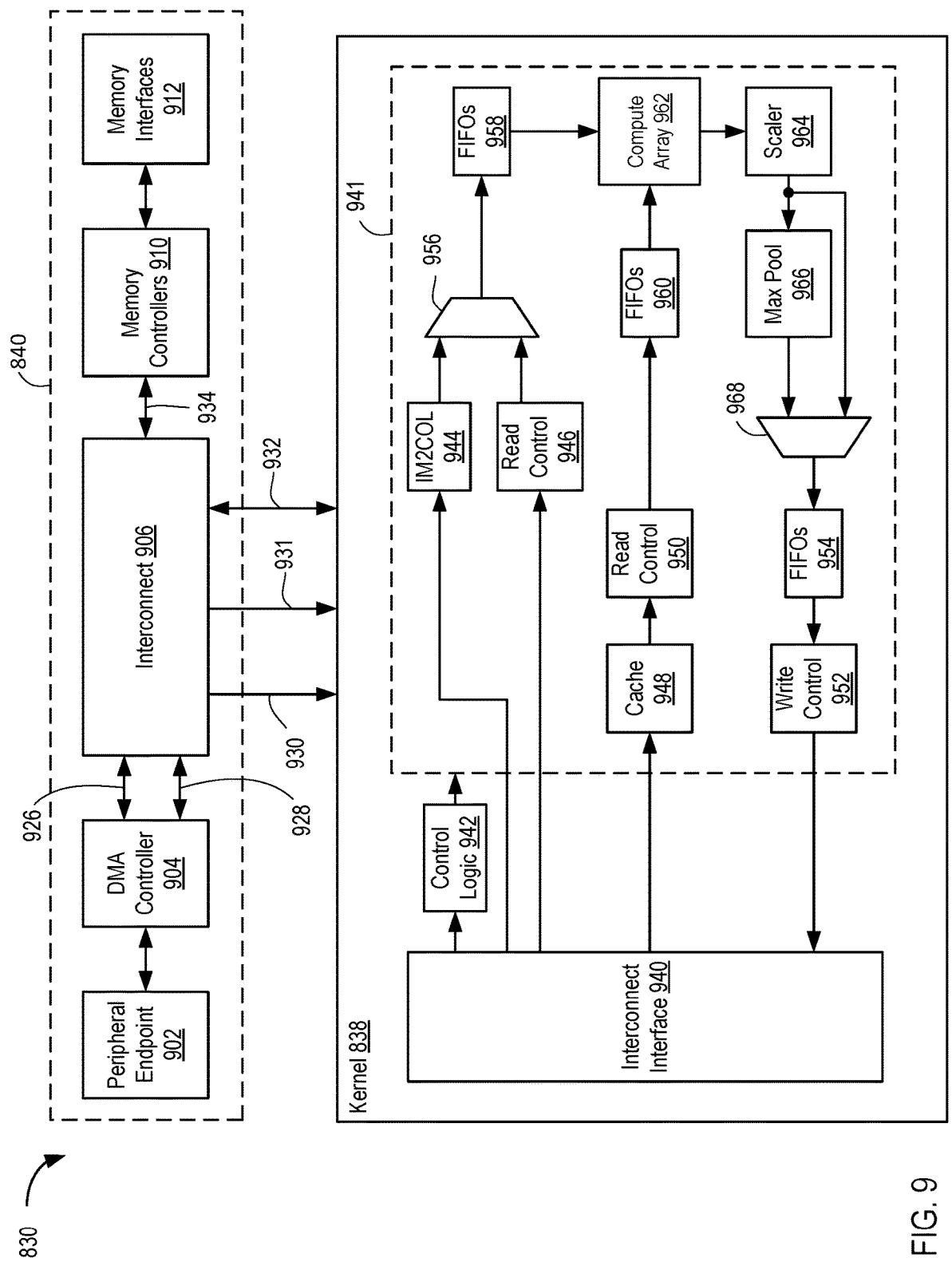
FIG. 9 is a block diagram depicting an acceleration circuit according to an example.

FIG. 9 is a block diagram depicting an acceleration circuit 830 according to an example. The acceleration circuit 830 includes the support circuits 840 and a kernel 838. In the example, the support circuits 840 include a PCIe endpoint circuit ("PCIe endpoint 902"), a PCIe DMA controller 904, interconnect circuits ("interconnect 906"), memory controllers 910, and memory interfaces 912. The support circuits 840 can include other circuits, which are omitted for clarity (e.g., decoupler circuits, debug circuits, etc.). The PCIe endpoint 302 provides a physical interface to the peripheral bus 815. The PCIe DMA controller 904 facilitates DMA operations to the RAM 826 and the kernel 838. The interconnect 906 couples the PCIe DMA controller 904 to the memory controllers 910 and to the kernel 838. The memory controllers 910 are coupled to the memory interfaces 912. The memory interfaces 912 are coupled to the RAM 826.

In operation, the acceleration libraries 846 can access the RAM 826 directly through the PCIe DMA controller 904. The acceleration libraries 846 can also access the kernel 838 through the PCIe DMA controller 904. The kernel 838 can access the RAM 826 through the memory controllers 910. Data can be exchanged between the software 806 and the kernel 838 using DMA operations between the system memory 816 and the RAM 826.

In the example, the kernel 838 uses interfaces 930, 931, and 932 to communicate with the interconnect 906. In particular, these interfaces may include a first read interface 930, a second read interface 931, and a read/write interface 932. For example, the read interface 930 can be used as a control interface for controlling the kernel 838. The read interface 931 can be used to read from the RAM 826 through a first one of the memory interfaces 912. The read/write interface 932 can be used to read and write from the RAM 826 through a second one of the memory interfaces 912.

The kernel 838 includes an interconnect interface 940, control logic 942, and processing circuits 941. The processing circuits 941 include an IM2COL circuit ("IM2COL 944"), a read control circuit ("read control 946"), a multiplexer 956, first-in-first-out circuits ("FIFOs 958"), DSP array 962, a scaler circuit ("scaler 964" such as a ReLU activation circuit), a max pool circuit ("max pool 966"), a multiplexer 968, FIFOs 954, write control circuit ("write control 952"), a cache 948, a read control circuit ("read control 950"), and FIFOs 960. The interconnect interface 940 is coupled to the interfaces 930, 931, and 932, the control logic 942, and the processing circuits 941. The interconnect interface 940 can include switches, clock converters, and the like to facilitate communication between the control logic 942 and the interface 930, as well as between the processing circuits 941 and the interfaces 931 and 932.

In the example, the interconnect interface 940 is coupled to inputs of the IM2COL circuit 944, the read control circuit 946, the cache 948, and the write control circuit 952. Outputs of the IM2COL circuit 944 and the read control circuit 946 are coupled to inputs of the multiplexer 956. An output of the multiplexer 956 is coupled to an input of the FIFOs 958. An output of the FIFOs 958 is coupled to a first input of the compute array 962. An output of the cache 948 is coupled to an input of the read control circuit 950. An output of the read control circuit 950 is coupled to an input of the FIFOs 960. An output of the FIFOs 960 is coupled to a second input of the compute array 962. An output of the compute array 962 is coupled to an input of the scaler 964. An output of the scaler 964 is coupled to an input of the max pool circuit 966 and an input of the multiplexer 968. An output of the max pool circuit 966 is coupled to another input of the multiplexer 968. An output of the multiplexer 968 is coupled to an input of the FIFOs 954. An output of the FIFOs 954 is coupled to the write control circuit 952.

In operation, the compute array 962 performs matrix multiplication operations for implementing a neural network. The inputs of the compute array 962 receive input activation matrices from the FIFOs 958 and weight matrices from the FIFOs 960. The input activation matrices can be read directly from the RAM 826 using the read control circuit 946. Alternatively, the input activations can be read from the RAM 826 and processed by the IM2COL circuit 944 for input to the compute array 962. Embodiments of the IM2COL circuit 944 are described below. Weight matrices can be read from the RAM 826 by the read control circuit 950 and cached in cache 948. The scaler 964 can scale the output of the compute array 962. The max pool circuit 966 can implement a max pooling function on the scaled output of the compute array 962. In one example, the max pool circuit 966 is implemented using CLBs or other configurable logic. Either the output of the max pool circuit 966 or the scaler 964 can be stored in the FIFOs 954. The write control circuit 952 writes data in the FIFOs to the RAM 826. The control logic 942 controls the various circuits in the processing circuits 941, such as the IM2COL circuit 944, the read control circuit 946, the multiplexers 956 and 968, the read control circuit 950, and the scaler 964, the max pool circuit 966, and the write control circuit 952.

Figure 10:
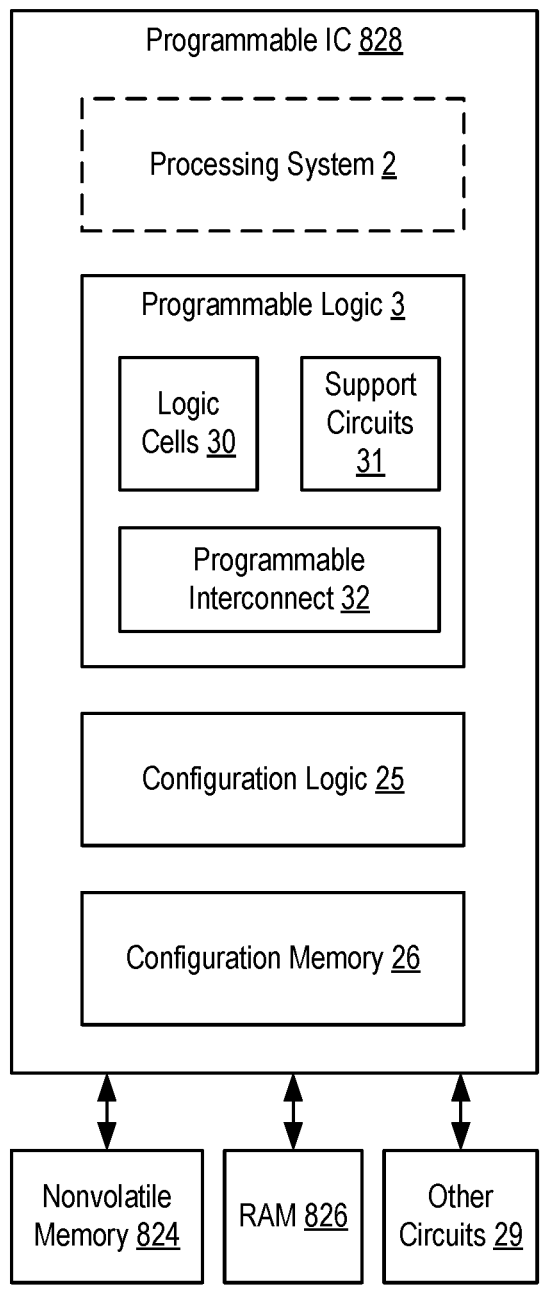
FIG. 10 is a block diagram depicting a programmable integrated circuit (IC) according to an example.

FIG. 10 is a block diagram depicting a programmable IC 828 according to an example. The programmable IC 828 includes programmable logic 3, configuration logic 25, and configuration memory 26. The programmable IC 828 can be coupled to external circuits, such as the NVM 824, the RAM 826, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 824 or any other source (e.g., the DRAM 28 or from the other circuits 29). In some examples, the programmable IC 828 includes a processing system 2. The processing system 2 can include microprocessor(s), memory, support circuits, 10 circuits, and the like. For example, the processing system 2 can include circuits similar to the processing system 810. In some examples, the processing system 2 can be used in place of the processing system 810. In such case, the entire computing system 108 can be implemented using the programmable IC 828, where the software 806 executes on the processing system 2.

Figure 11:
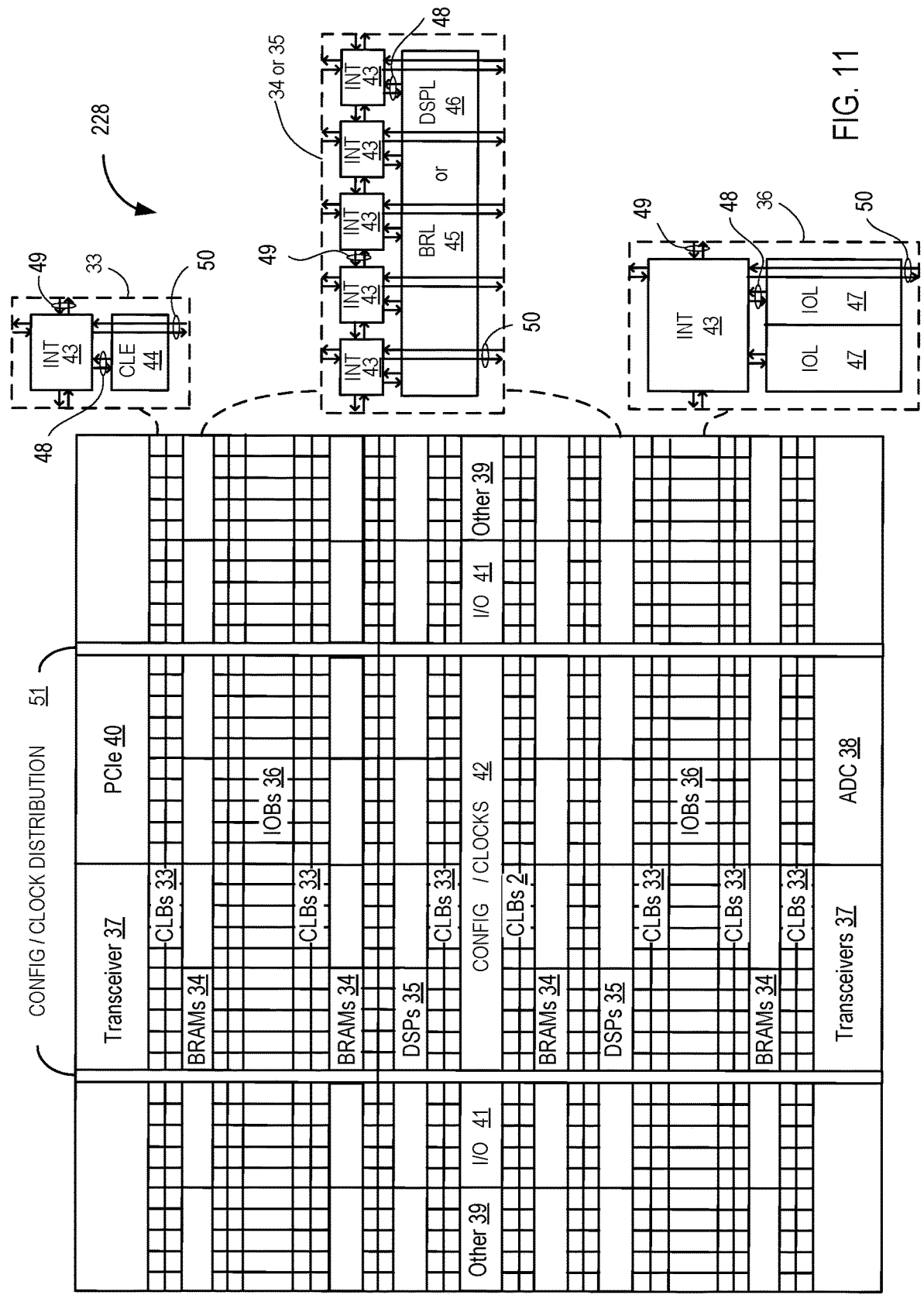
FIG. 11 illustrates a FPGA implementation of a programmable IC according to an example.

FIG. 11 illustrates an FPGA implementation of the programmable IC 828 that includes a large number of different programmable tiles including transceivers 37, CLBs) 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 11. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 11) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 11 include additional logic blocks that disrupt the regular columnar structure making up a large part of the FPGA. The additional logic blocks can be programmable blocks and/or dedicated logic.

Note that FIG. 11 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 11 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects described herein may take the form of an entirely hardware embodiment, an entirely software embodiment (including firmware, resident software, micro-code, etc.) or an embodiment combining software and hardware aspects that may all generally be referred to herein as a "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method for scheduling operations of a neural network, the method comprising:
receiving a model defining a sequential order of a plurality of pipelined functions performed when executing a first layer in the neural network, wherein the neural network comprises a plurality of layers;
generating, based on the model, source code defining parallelized systolic arrays, the parallelized systolic arrays comprising a plurality of interconnected processing elements, wherein different pipelined functions of the plurality of pipelined functions are assigned to different systolic arrays of the parallelized systolic arrays, and the interconnected processing elements in each of the parallelized systolic arrays perform identical processes in order to concurrently execute a respective pipelined function of the plurality of pipelined functions defined by the first layer of the neural network; and
compiling, using one or more computing processors, the source code corresponding to the model and the parallelized systolic arrays into a hardware level design that provides a static schedule when executing the neural network in a hardware system, wherein compiling the source code comprises:
converting the source code corresponding to at least one systolic array included in the parallelized systolic arrays into a two dimensional array of interconnected processing elements;
identifying a plurality of operations that are performed by all of the plurality of interconnected processing elements; and
assigning the plurality of operations to different hardware elements in the hardware system such that the plurality of operations are able to be performed concurrently.

2. The method of claim 1, further comprising:
configuring a field programmable gate array (FPGA) based on the hardware level design, wherein the hardware level design comprises register transfer level (RTL) code.

3. The method of claim 1, wherein generating the source code defining the parallelized systolic arrays is performed in response to determining that the interconnected processing elements in each of the parallelized systolic arrays perform identical processes.

4. The method of claim 1, wherein the model comprises a software defined parallelization pragma indicating the sequential order of the plurality of pipelined functions.

5. The method of claim 1, wherein the source code corresponding to the model comprises untimed functional code for the neural network.

6. The method of claim 1, wherein the plurality of pipelined functions includes at least one of a convolution unit, a pooling unit, and a matrix multiplier that transmits data to an activation unit in the plurality of pipelined functions.

7. A non-transitory computer-readable storage medium storing instructions, which when executed on one or more processing devices, perform an operation for scheduling a neural network, the operation comprising:
receiving a model defining a sequential order of a plurality of pipelined functions performed when executing a first layer in the neural network, wherein the neural network comprises a plurality of layers;
generating, based on the model, source code defining parallelized systolic arrays, the parallelized systolic arrays comprising a plurality of interconnected processing elements, wherein different pipelined functions of the plurality of pipelined functions are assigned to different systolic arrays of the parallelized systolic arrays, and the interconnected processing elements in each of the parallelized systolic arrays perform identical processes in order to concurrently execute a respective pipelined function of the plurality of pipelined functions defined by the first layer of the neural network; and
compiling the source code corresponding to the model and the parallelized systolic arrays into a hardware level design that provides a static schedule when executing the neural network in a hardware system, wherein compiling the source code comprises:
converting the source code corresponding to at least one systolic array included in the parallelized systolic arrays into a two dimensional array of interconnected processing elements;
identifying a plurality of operations that are performed by all of the plurality of interconnected processing elements; and
assigning the plurality of operations to different hardware elements in the hardware system such that the plurality of operations are able to be performed concurrently.

8. The computer-readable storage medium of claim 7, wherein the operation further comprises:
configuring a field programmable gate array (FPGA) based on the hardware level design, wherein the hardware level design comprises register transfer level (RTL) code.

9. The computer-readable storage medium of claim 7, wherein generating the source code defining the parallelized systolic array is performed in response to determining that the interconnected processing elements in each of the parallelized systolic arrays perform identical processes.

10. The computer-readable storage medium of claim 7, wherein the model comprises a software defined parallelization pragma indicating the sequential order of the plurality of pipelined functions.

11. The computer-readable storage medium of claim 7, wherein the source code corresponding to the model comprises untimed functional code for the neural network.

12. The computer-readable storage medium of claim 7, wherein the plurality of pipelined functions includes at least one of a convolution unit, a pooling unit, and a matrix multiplier that transmits data to an activation unit in the plurality of pipelined functions.

13. A computing system, comprising:
a processor; and
a memory coupled to the processor and comprising a compiler, wherein the compiler, when executed by the processor performs an operation comprising:
receiving a model defining a sequential order of a plurality of pipelined functions performed when executing a first layer in a neural network, wherein the neural network comprises a plurality of layers;
generating, based on the model, source code defining parallelized systolic arrays, the parallelized systolic arrays comprising a plurality of interconnected processing elements, wherein different pipelined functions of the plurality of pipelined functions are assigned to different systolic arrays of the parallelized systolic arrays, and the interconnected processing elements in each of the parallelized systolic arrays perform identical processes in order to concurrently execute a respective pipelined function of the plurality of pipelined functions defined by the first layer of the neural network; and
compiling the source code corresponding to the model and the parallelized systolic arrays into a hardware level design that provides a static schedule when executing the neural network in a hardware system, wherein compiling the source code comprises:

converting the source code corresponding to at least one systolic array included in the parallelized systolic arrays into a two dimensional array of interconnected processing elements;

identifying a plurality of operations that are performed by all of the plurality of interconnected processing elements; and assigning the plurality of operations to different hardware elements in the hardware system such that the plurality of operations are able to be performed concurrently.

14. The computing system of claim 13, wherein the operation further comprises:

configuring a field programmable gate array (FPGA) based on the hardware level design, wherein the hardware level design comprises register transfer level (RTL) code.

15. The computing system of claim 13, wherein generating the source code defining the parallelized systolic array is performed in response to determining that the interconnected processing elements in each of the parallelized systolic arrays perform identical processes.

16. The computing system of claim 13, wherein the model comprises a software defined parallelization pragma indicating the sequential order of the plurality of pipelined functions.

17. The computing system of claim 13, wherein the source code corresponding to the model comprises untimed functional code for the neural network.

\* \* \* \* \*